United States Patent
Nagahara

[11] Patent Number: 6,011,660
[45] Date of Patent: *Jan. 4, 2000

[54] IMAGING LENS

[75] Inventor: Akiko Nagahara, Omiya, Japan

[73] Assignee: Fuji Photo Optical Co., Ltd., Saitama, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/997,332

[22] Filed: Dec. 23, 1997

[30] Foreign Application Priority Data

Jan. 23, 1997 [JP] Japan ................................. 9-259000

[51] Int. Cl.[7] ........................................................ G02B 9/04
[52] U.S. Cl. ............................ 359/793; 359/708; 359/740
[58] Field of Search ..................................... 359/740, 708, 359/717, 793, 794, 795, 739

[56] References Cited

U.S. PATENT DOCUMENTS 5,270,867  12/1993  Estelle ....................................... 359/692
5,475,536  12/1995  Kikutani .................................. 359/794
5,801,890   9/1998  Yamada ................................... 359/793

FOREIGN PATENT DOCUMENTS 6-67091   3/1994  Japan.
7-168092  7/1995  Japan.

Primary Examiner—Huy Mai
Attorney, Agent, or Firm—Snider & Associates; Ronald R. Snider

[57] ABSTRACT

An imaging lens is constituted by two lens sheets, in which the lens on the object side is a meniscus lens having a convex surface on the image surface side, and the lens on the image surface side is a meniscus lens having a convex surface on the image surface side, while at least one lens surface is formed as an aspheric surface, thereby realizing smaller size, wider field angle, higher brightness, lower cost, and favorably-corrected various kinds of aberration. A first lens $L_1$ is a positive meniscus lens having a convex surface directed toward the image surface side, and a second lens $L_2$ is a positive meniscus lens having a convex surface directed toward the object side. Also, these lenses satisfy the following conditional expressions:

$0.6 \leq |R_1/f| \leq 1.35$        (1)

$0.5 \leq R_1/R_2 \leq 1.6$        (2)

9 Claims, 13 Drawing Sheets

$\omega = 0°$ — 0.05 (mm) / -0.05

$\omega = 13°$ — 0.05 (mm) / -0.05

$\omega = 19.7°$ — 0.05 (mm) / -0.05

$\omega = 26.7°$ — 0.05 (mm) / -0.05

$\omega = 34.3°$ — 0.05 (mm) / -0.05

IMAGING LENS

RELATED APPLICATIONS

This application claims the priority of Japanese Patent Application No. 9-25900 filed on Jan. 23, 1997, which is incorporated herein by reference.

BACKGROUND OF THE INVENTION

1. Field of the Invention

The present invention relates to an imaging lens composed of two lens sheets and, in particular, to an imaging lens suitable as a taking lens for a video camera or still video camera used for TV phone, door phone, monitoring purposes, or the like.

2. Description of the Prior Art

Recently, solid-state imaging devices have often been placed on imaging surfaces of various kinds of video cameras and still video cameras. With the advance of technology, such solid-state imaging devices have been reducing their size year by year, accompanying demands for imaging lenses to attain smaller size, wider angle of view, and lower cost.

Conventionally known as the imaging lens used for the above-mentioned purposes is the one disclosed in Japanese Unexamined Patent Publication No. 6-67091 or the like. The back focus of the imaging lens disclosed in this publication, however, is so long that it may not always satisfy the demand for smaller size.

An imaging lens composed of two lens sheets made of glass has already been disclosed in a commonly-assigned application (Japanese Unexamined Patent Publication No. 7-168092). Though this imaging lens, composed of two lens sheets, has a small total length which can satisfy the demand for smaller size, its angle of view decreases as well, whereby it may fail to fully satisfy the demand for wider angle of view.

SUMMARY OF THE INVENTION

In view of the foregoing circumstances, it is an object of the present invention to provide an imaging lens which can attain a wide angle of view, a small size, and a high brightness, while being able to favorably correct various kinds of aberration.

The imaging lens in accordance with the present invention comprises, successively from an object side, a first lens made of a meniscus lens having a convex surface directed toward an image surface side, and a second lens made of a meniscus lens having a convex surface directed toward the object side; wherein at least one of four lens surfaces is formed as an aspheric surface.

Preferably, the above-mentioned imaging lens satisfies the following conditional expressions (1) and (2):

$$0.6 \leq |R_1/f| \leq 1.35 \quad (1)$$

$$0.5 \leq R_1/R_2 \leq 1.6 \quad (2)$$

wherein $R_1$ and $R_2$ are radii of curvature of surfaces of the first lens on the object side and image surface side, respectively, and f is a focal length of the whole lens system.

Preferably, a stop is disposed between the first and second lenses.

DESCRIPTION OF THE PREFERRED EMBODIMENTS

In the following, embodiments of the present invention will be explained with reference to the accompanying drawings.

Figure 1:
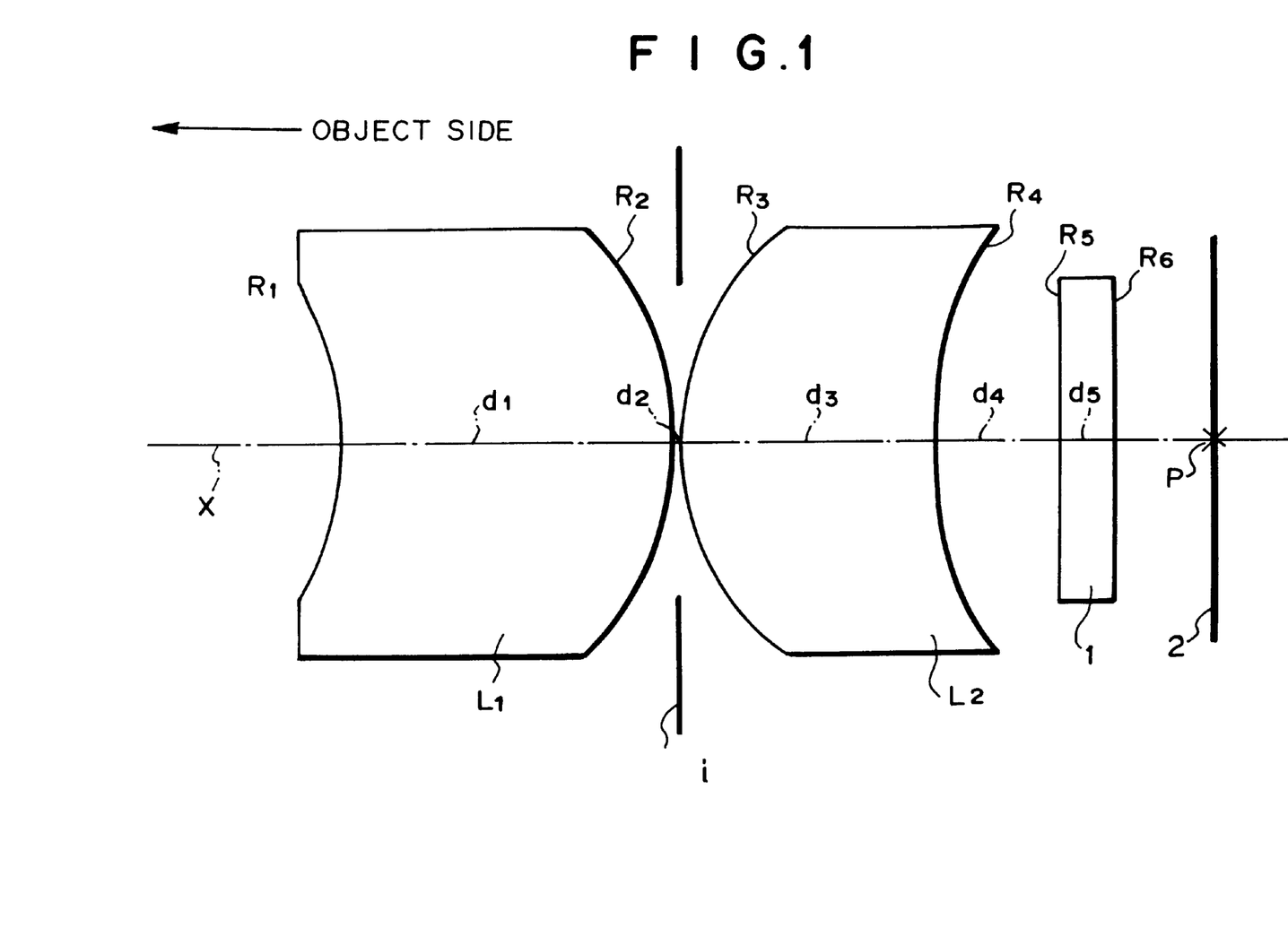
FIG. 1 is a schematic view showing a basic lens configuration in accordance with Examples 1 to 6 of the present invention.

FIG. 1 shows a basic lens configuration of Example 1 representing Examples 1 to 6. As depicted, this imaging lens is constituted by two lenses $L_1$ and $L_2$, and a stop i disposed therebetween. A luminous flux incident on the imaging lens along an optical axis X from the object side forms an image at an imaging position P of an imaging surface 2 of a solid-state imaging device. Here, a low-pass filter 1 is disposed between the second lens $L_2$ and the imaging surface 2.

Here, the first lens $L_1$ is a meniscus lens having a convex surface directed toward the image surface side (being a positive lens in Examples 1, 3, 4, and 5, and a negative lens in Examples 2 and 6; while both surfaces thereof being aspheric surfaces in Examples 1, 2, 3, and 5), and the second lens $L_2$ is a positive meniscus lens having a convex surface directed toward the object side (both surfaces thereof being aspheric surfaces in Examples 1, 2, 3, 5, and 6; whereas only the surface on the image surface side being an aspheric surface in Example 4).

Also, these lenses satisfy the following conditional expressions:

$$0.6 \leq |R_1/f| \leq 1.35 \quad (1)$$

$$0.5 \leq R_1/R_2 \leq 1.6 \quad (2)$$

wherein $R_1$ and $R_2$ are radii of curvature of surfaces of the first lens $L_1$ on the object side and image surface side, respectively, and f is a focal length of the whole lens system.

In the lens configuration in accordance with this embodiment, as shown in FIG. 1, the surface of the first lens $L_1$ on the object side is concave, whereby the incident light beam is bent outward, thus allowing the angle of view to become wider. Also, as at least one aspheric surface is provided in the lens system, spherical aberration, coma, and distortion can be made favorable. Further, as the stop i is disposed between the two lenses $L_1$ and $L_2$, the whole lens system can become symmetrical with respect to the stop i, whereby the lens diameter can be made smaller.

The above-mentioned conditional expression (1) defines a range of the level obtained when the radius of curvature $R_1$ of the surface of the first lens $L_1$ on the object side is standardized by the focal length f of the whole lens system. Below the lower limit of this range, the lens form approaches a hemisphere, whereby its manufacture becomes difficult. Also, coma becomes greater in the periphery of the lens. It may become darker when the peripheral luminous flux is cut off, whereas distortion may occur when these conditions are to be corrected. Beyond the upper limit of this range, by contrast, astigmatism and coma may enhance when a wide angle of view is to be maintained, whereby the lens thickness may become greater. The lens in accordance with this embodiment satisfies this conditional expression (1), thereby advantageously correcting coma, astigmatism, and distortion. Also, while a wide angle of view is maintained, compactness can be attained, and brightness can be secured.

The above-mentioned conditional expression (2) defines the ratio between radii of curvature $R_1$ and $R_2$ of both surfaces of the first lens $L_1$. Below its lower limit, the total length may become greater, and the lens diameter may increase when the total length is to be restricted. Also, distortion may enhance. Beyond the upper limit, by contrast, coma may increase. The lens in accordance with this embodiment satisfies this conditional expression (2), thereby advantageously correcting coma and distortion, while attaining compactness.

In the following, respective imaging lenses of Examples 1 to 6 will be explained with reference to specific values.

Example 1

Table 1 (follows) shows radius of curvature R (mm) of each lens surface, center axis of each lens and air gap between neighboring lenses d (mm), refractive index n of each lens at e-line, and Abbe number ν of each lens in Example 1.

In Table 1, as well as in Tables 2 to 6 which will be explained later, numbers referring to letters R, d, n, and ν successively increase from the object side. Surfaces marked with asterisk indicate aspheric surfaces, which are expressed by the aspheric surface expression defined by the following expression 1.

Expression 1

Aspheric surface expression $Z = CY^2/(1+(1-KC^2Y^2)^{1/2}) + a_4Y^4 + a_6Y^6 + a_8Y^8 + a_{10}Y^{10}$ wherein C is a curvature of an apex of aspheric surface;

K is a conical constant;

$a_i$ is an aspheric surface constant;

Y is a height from the optical axis; and

Z is a distance from a tangent plane at the apex of the lens surface to a point on the aspheric surface.

In Example 1, the focal length f of the whole lens system is 4.97 mm, back focus BF is 2.98 mm, Fno is 2.01, and half angle of view ω is 36.4°. Also, $|R_1/f|$ is 1.29, whereas $R_1/R_2$ is 1.5.

Example 2

Table 2 (follows) shows radius of curvature R (mm) of each lens surface, center axis of each lens and air gap between neighboring lenses d (mm), refractive index n of each lens at e-line, and Abbe number ν of each lens in Example 2.

In Example 2, the focal length f of the whole lens system is 5.51 mm, back focus BF is 6.00 mm, Fno is 2.00, and half angle of view ω is 32.9°. Also, $|R_1/f|$ is 0.72, whereas $R_1/R_2$ is 0.55.

Example 3

Table 3 (follows) shows radius of curvature R (mm) of each lens surface, center axis of each lens and air gap between neighboring lenses d (mm), refractive index n of each lens at e-line, and Abbe number ν of each lens in Example 3.

In Example 3, the focal length f of the whole lens system is 4.99 mm, back focus BF is 5.26 mm, Fno is 2.03, and half angle of view ω is 32.5°. Also, $|R_1/f|$ is 0.64, whereas $R_1/R_2$ is 0.9.

Example 4

Table 4 (follows) shows radius of curvature R (mm) of each lens surface, center axis of each lens and air gap between neighboring lenses d (mm), refractive index n of each lens at e-line, and Abbe number ν of each lens in Example 4.

In Example 4, the focal length f of the whole lens system is 5.01 mm, back focus BF is 5.08 mm, Fno is 2.17, and half angle of view ω is 36.4°. Also, $|R_1/f|$ is 0.81, whereas $R_1/R_2$ is 0.75.

Example 5

Table 5 (follows) shows radius of curvature R (mm) of each lens surface, center axis of each lens and air gap between neighboring lenses d (mm), refractive index n of each lens at e-line, and Abbe number ν of each lens in Example 5.

In Example 5, the focal length f of the whole lens system is 4.99 mm, back focus BF is 2.98 mm, Fno is 2.07, and half angle of view ω is 36.5°. Also, $|R_1/f|$ is 1.02, whereas $R_1/R_2$ is 1.31.

Example 6

Table 6 (follows) shows radius of curvature R (mm) of each lens surface, center axis of each lens and air gap between neighboring lenses d (mm), refractive index n of each lens at e-line, and Abbe number ν of each lens in Example 6.

In Example 6, the focal length f of the whole lens system is 5.18 mm, back focus BF is 4.81 mm, Fno is 2.11, and half angle of view ω is 34.3°. Also, $|R_1/f|$ is 0.91, whereas $R_1/R_2$ is 0.73.

Figure 2A:
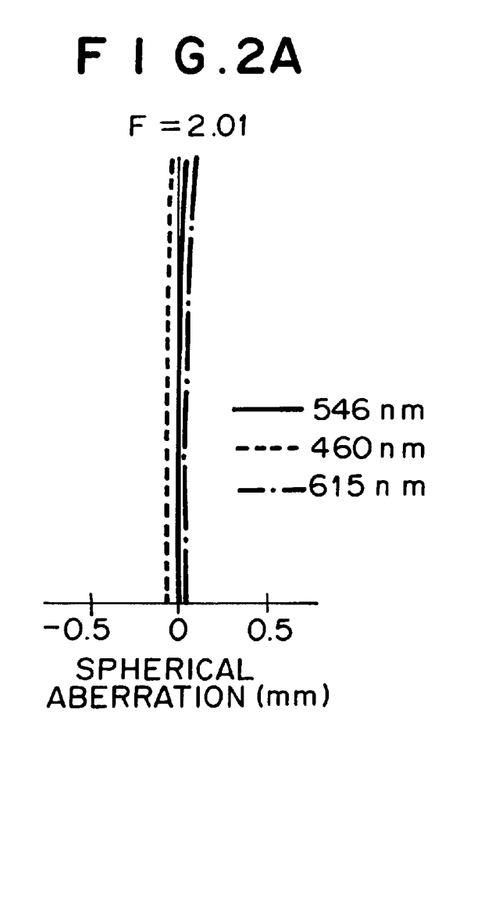
FIG. 2A, 2B and 2C are aberration charts (for spherical aberration, astigmatism, and distortion) of the lens in accordance with Example 1.
Figure 2B:
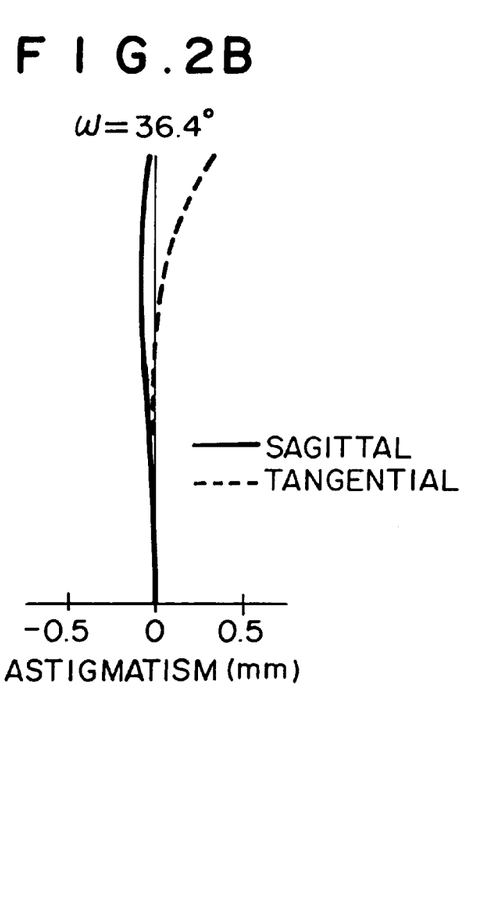
Figure 2C:
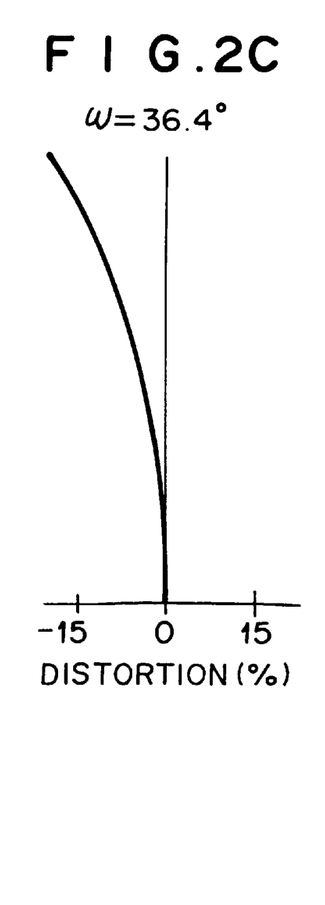
Figure 3:
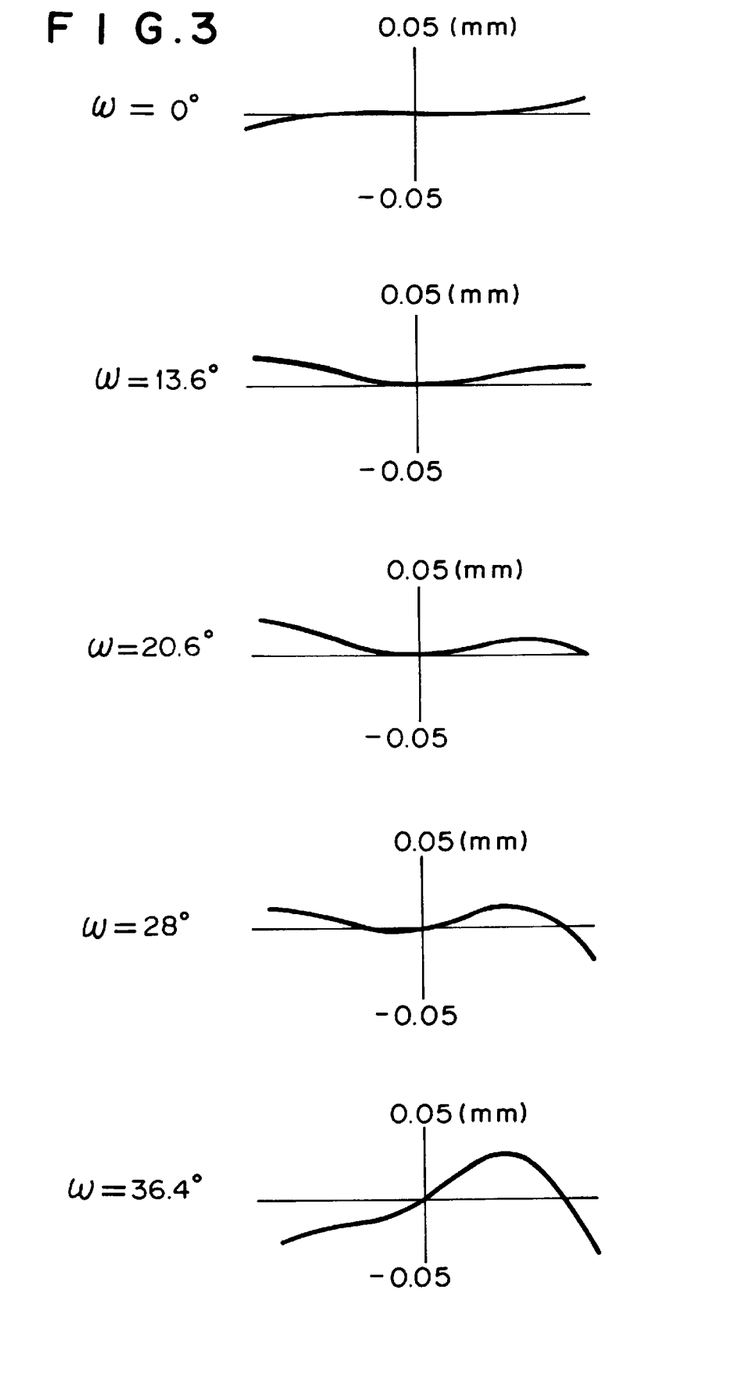
FIG. 3 is an aberration chart (for coma) of the lens in accordance with Example 1.
Figure 4A:
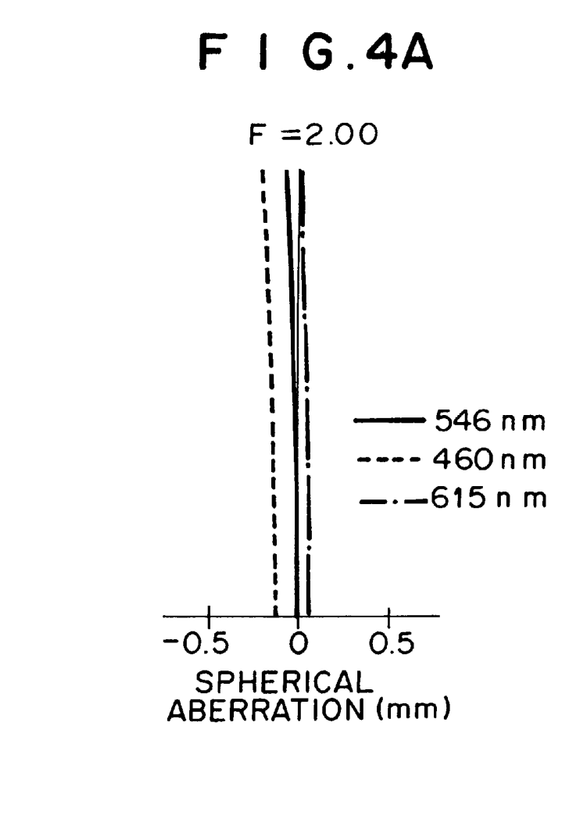
FIG. 4A, 4B and 4C are aberration charts (for spherical aberration, astigmatism, and distortion) of the lens in accordance with Example 2.
Figure 4B:
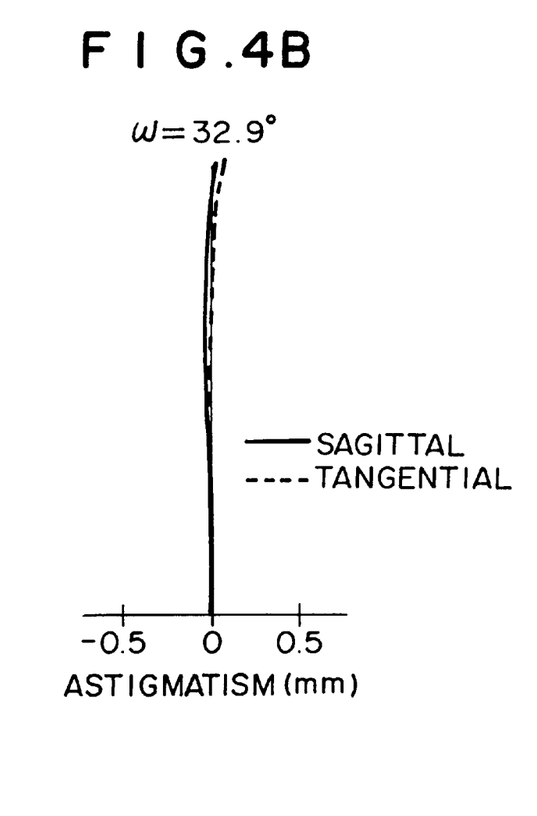
Figure 4C:
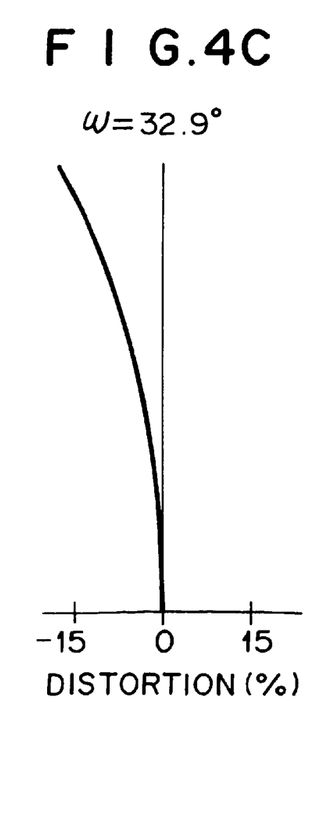
Figure 5:
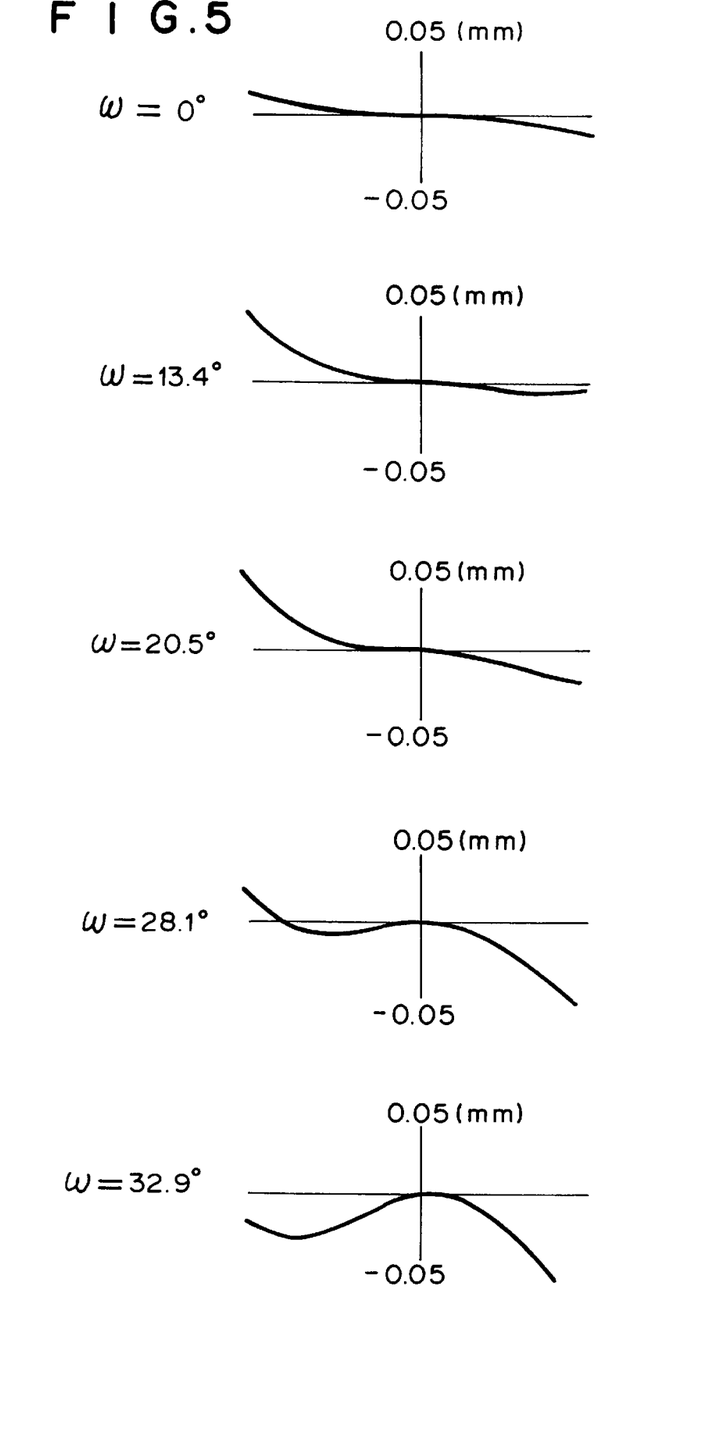
FIG. 5 is an aberration chart (for coma) of the lens in accordance with Example 2.
Figure 6A:
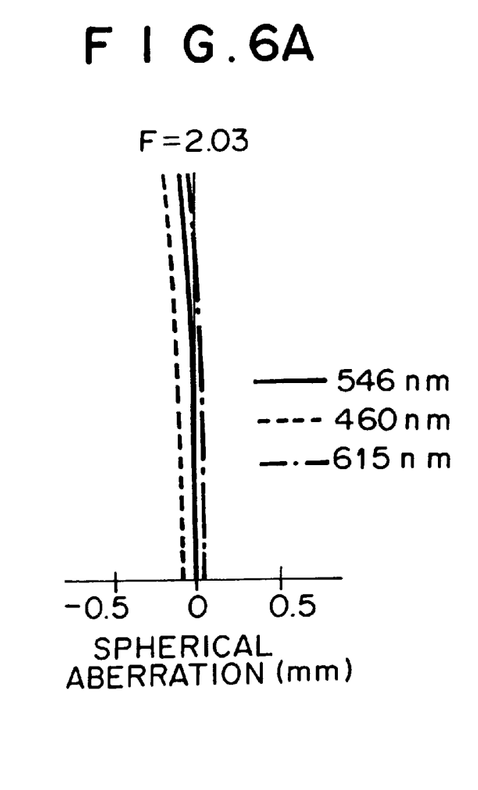
FIG. 6A, 6B and 6C are aberration charts (for spherical aberration, astigmatism, and distortion) of the lens in accordances with Example 3.
Figure 6B:
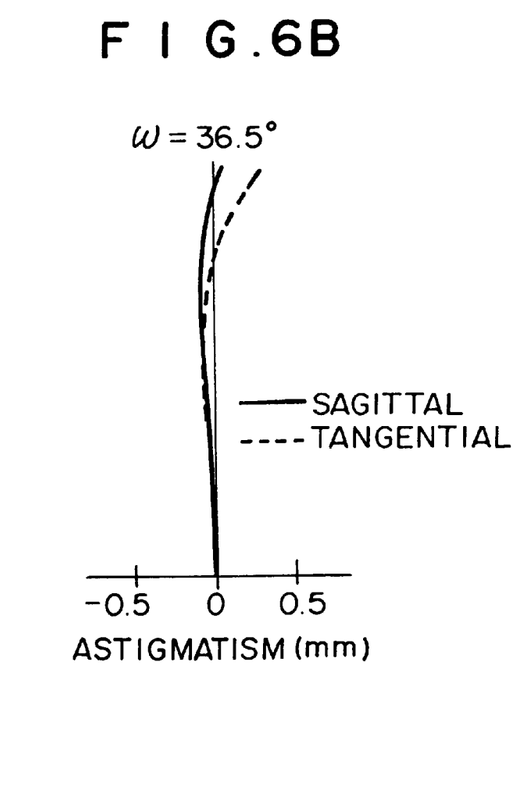
Figure 6C:
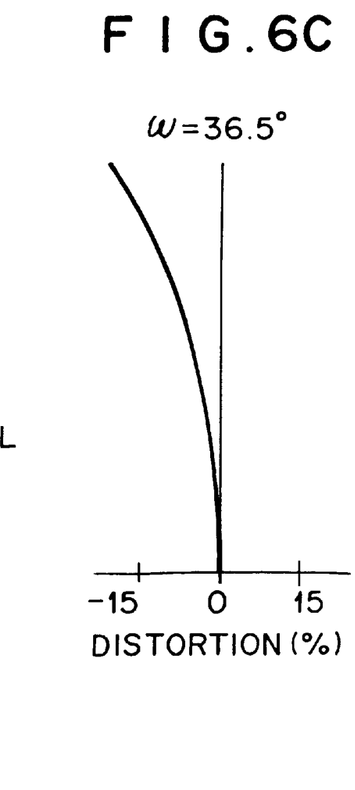
Figure 7:
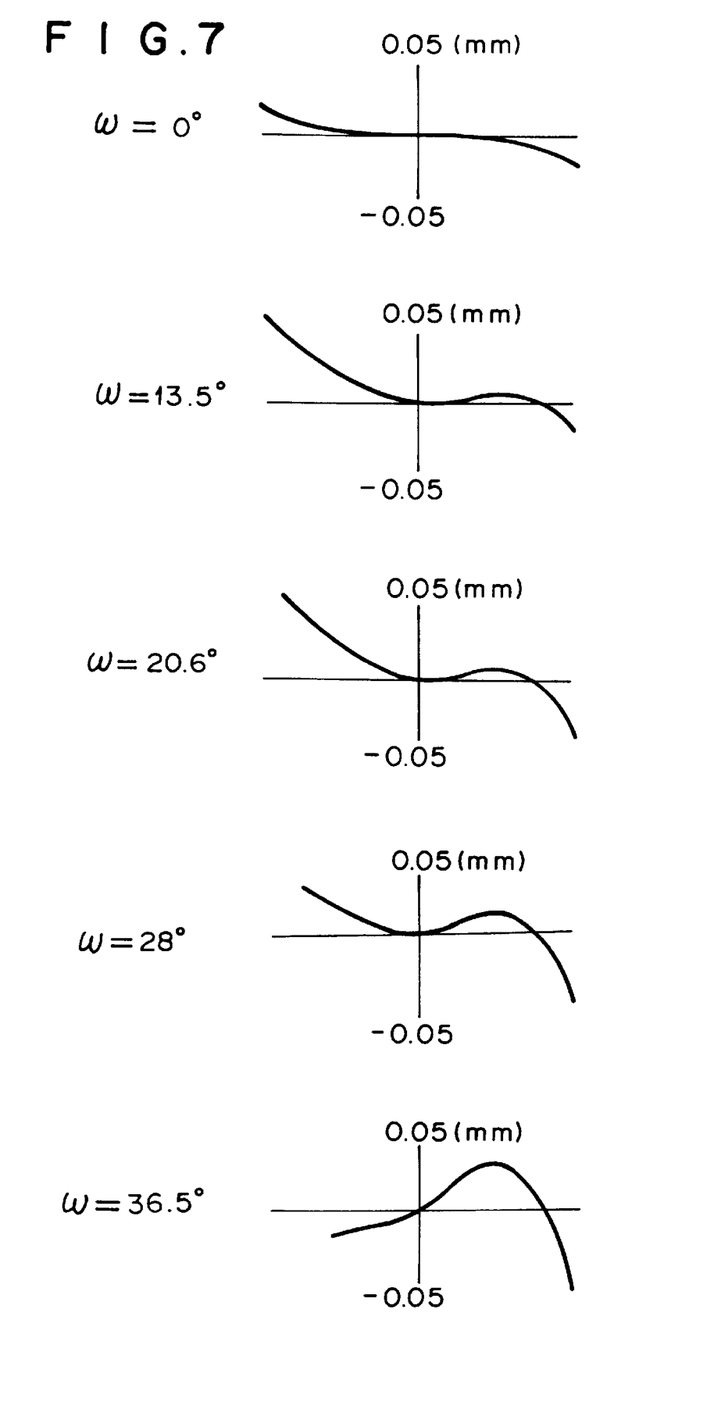
FIG. 7 is an aberration chart (for coma) of the lens in accordance with Example 3.
Figure 8A:
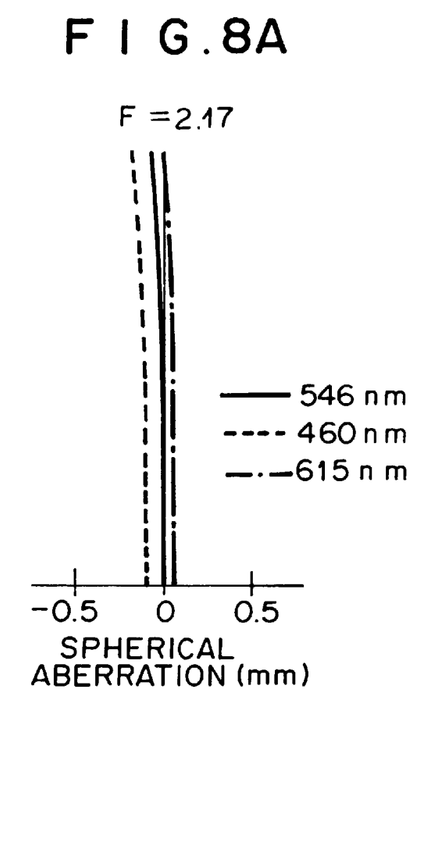
FIG. 8A, 8B and 8C are aberration charts (for spherical aberration, astigmatism, and distortion) of the lens in accordance with Example 4.
Figure 8B:
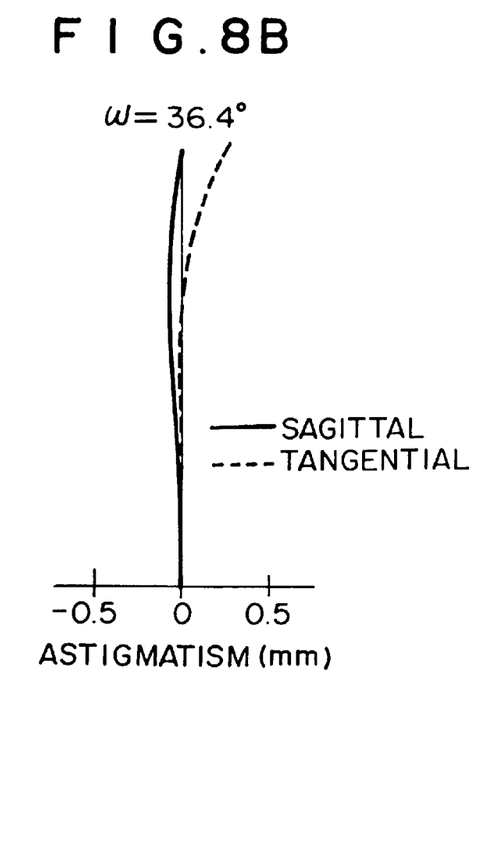
Figure 8C:
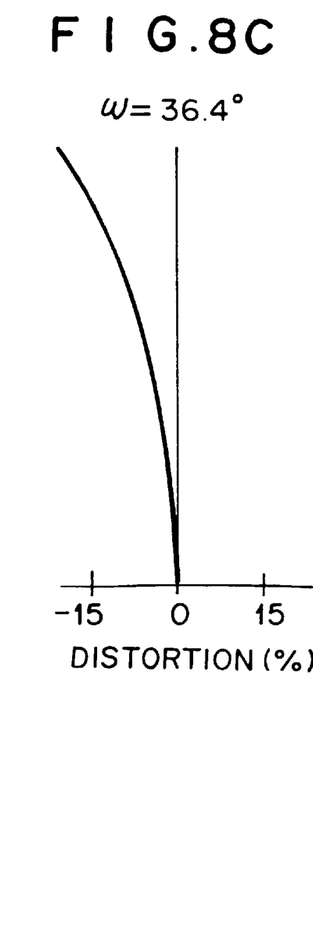
Figure 9:
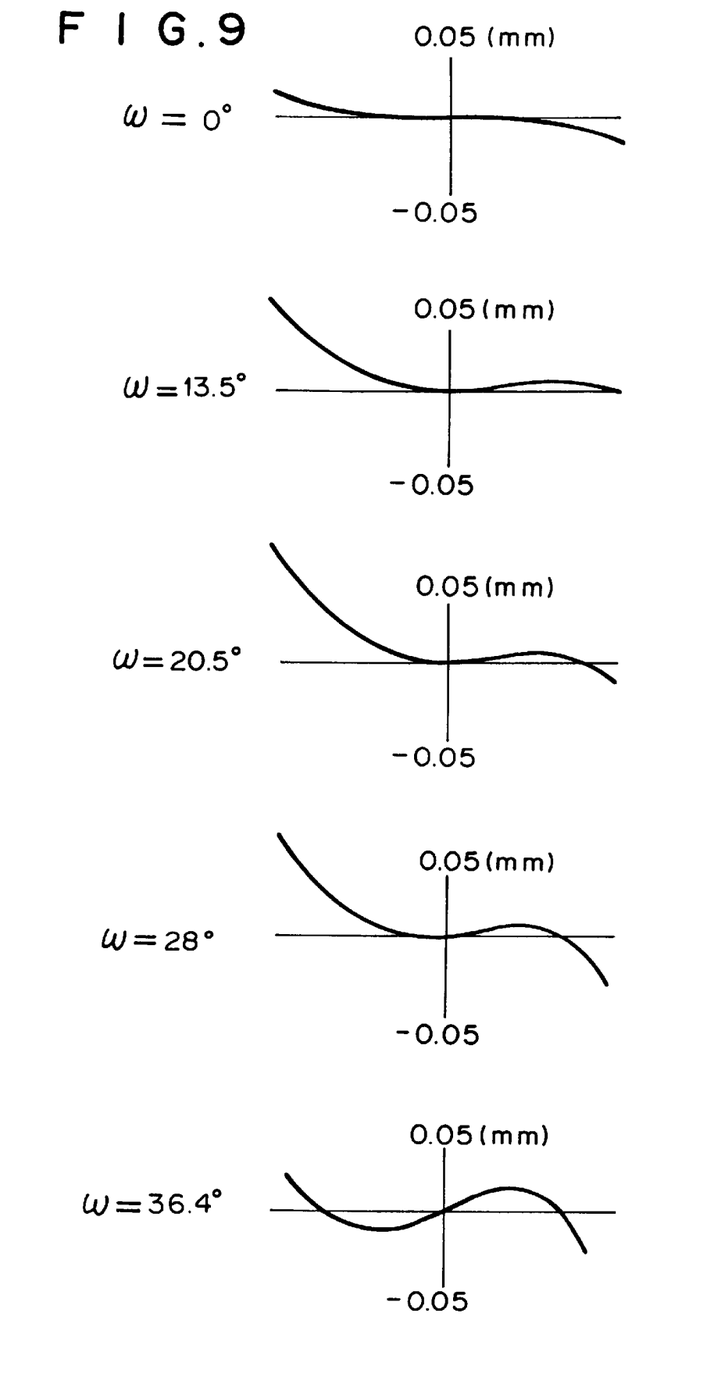
FIG. 9 is an aberration chart (for coma) of the lens in accordance with Example 4.
Figure 10A:
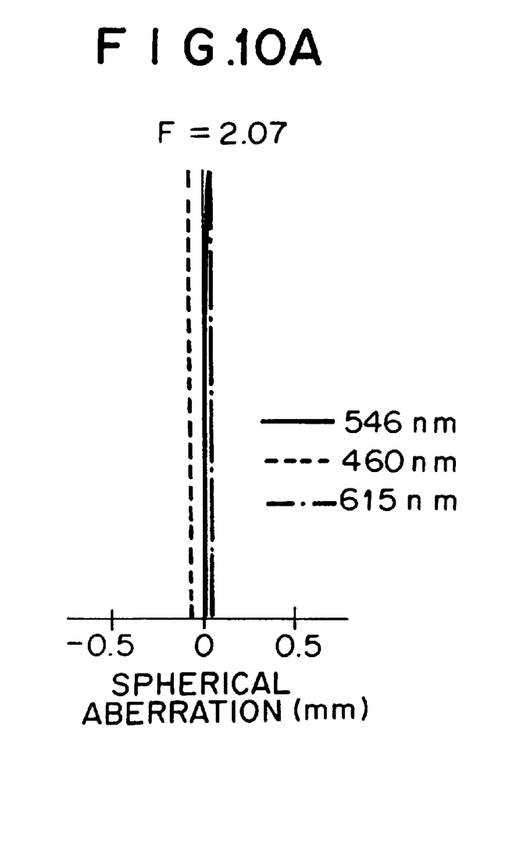
FIG. 10A, 10B and 10C are aberration charts (for spherical aberration, astigmatism, and distortion) of the lens in accordance with Example 5.
Figure 10B:
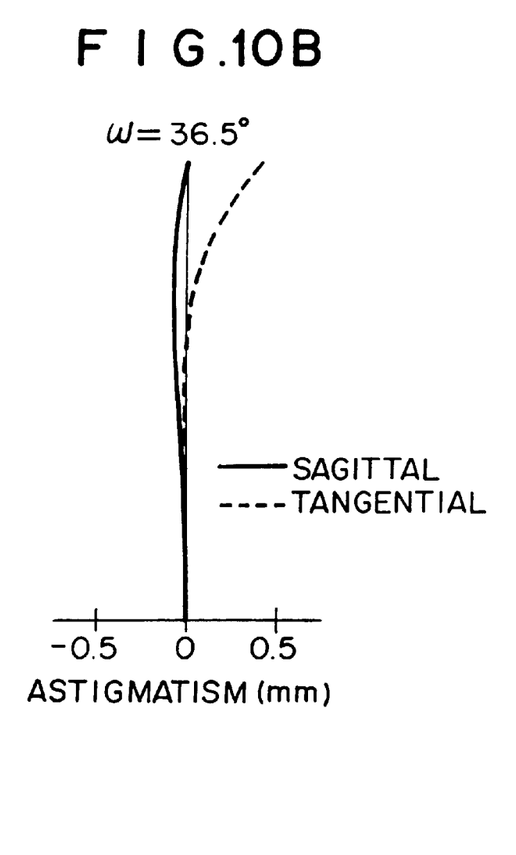
Figure 10C:
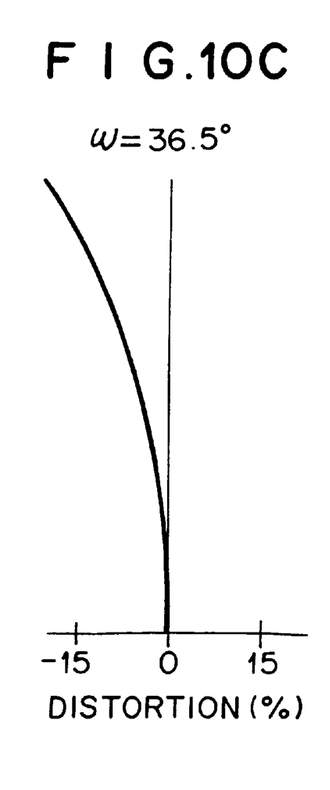
Figure 11:
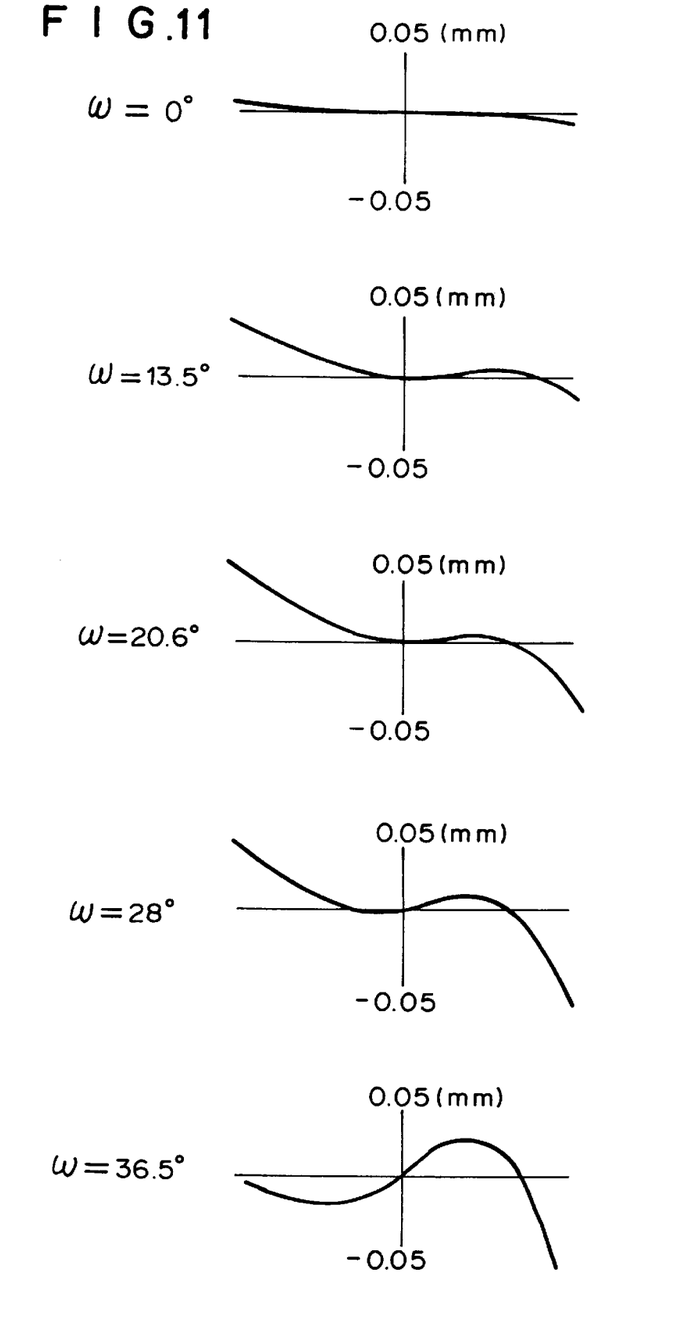
FIG. 11 is an aberration chart (for coma) of the lens in accordance with Example 5.
Figure 12A:
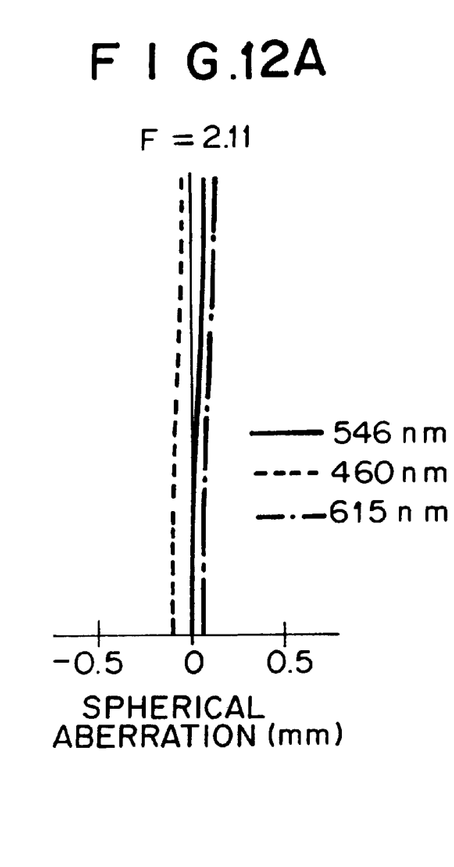
FIG. 12A, 12B and 12C are aberration charts (for spherical aberration, astigmatism, and distortion) of the lens in accordance with Example 6.
Figure 12B:
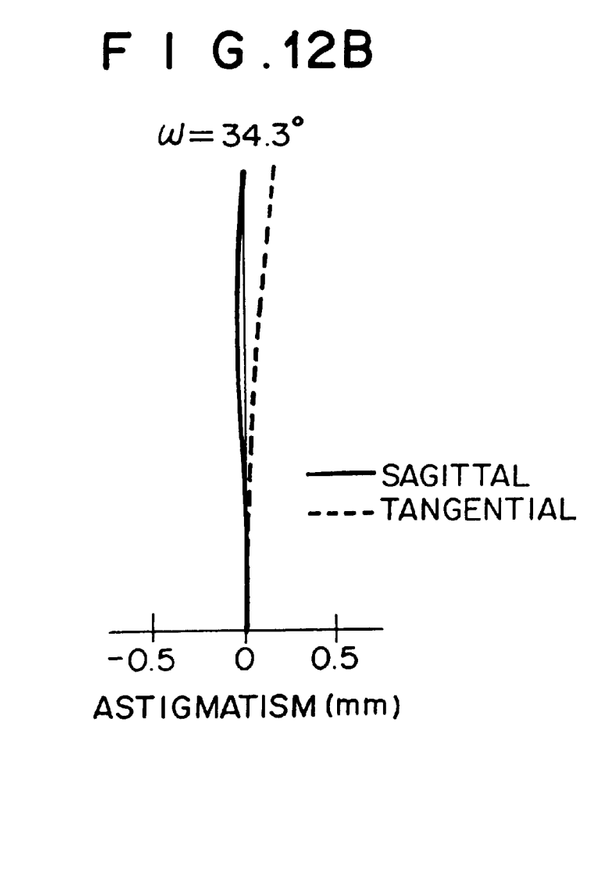
Figure 12C:
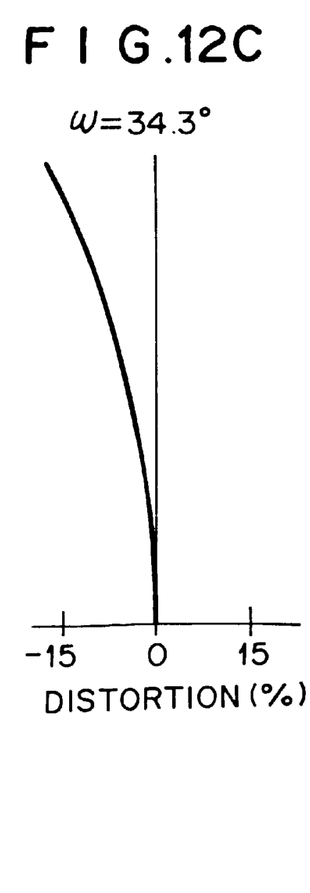
Figure 13:
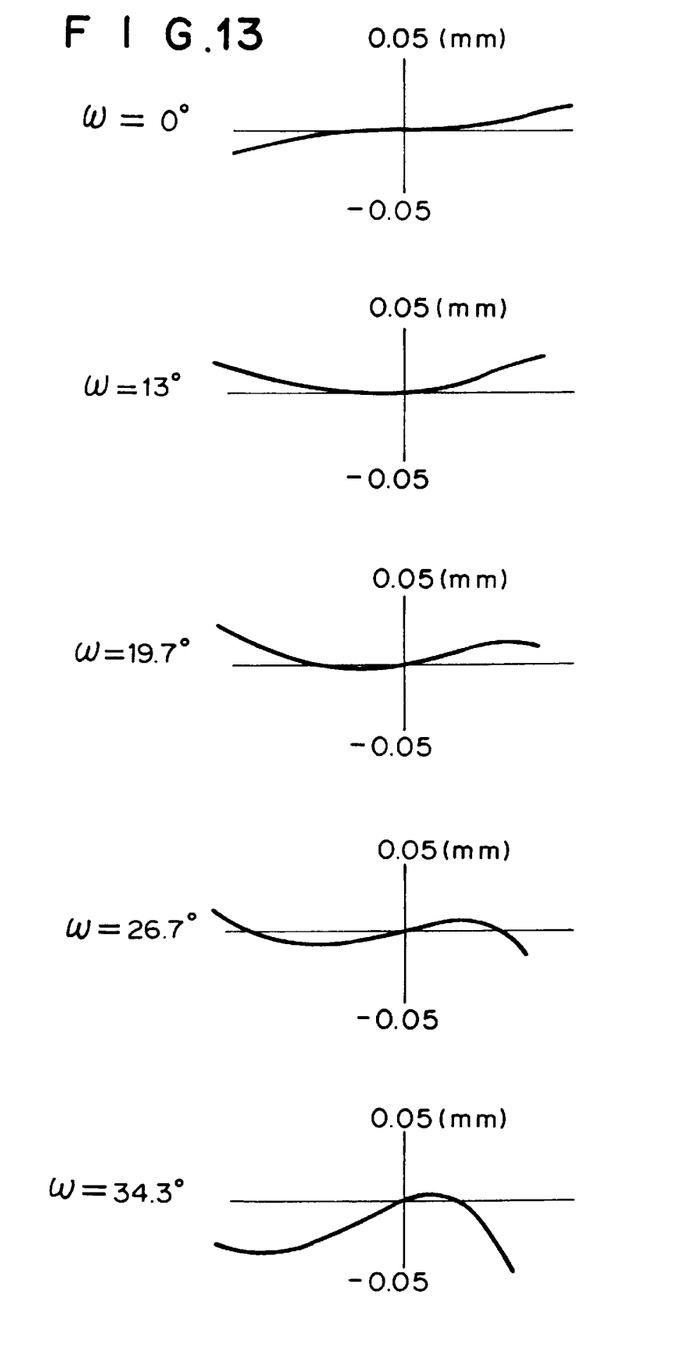
FIG. 13 is an aberration chart (for coma) of the lens in accordance with Example 6.

FIGS. 2(2A, 2B, 2C), 4(4A, 4B, 4C), 6(6A, 6B, 6C), 8(8A, 8B, 8C), 10(10A, 10B, 10C), and 12(12A, 12B, 12C) show respective aberrations (spherical aberration, astigmatism, and distortion) of Examples 1 to 6; whereas FIGS. 3, 5, 7, 9, 11, and 13 show respective comas of Examples 1 to 6. In these aberration charts, ν indicates half angle of view. As can be seen from FIGS. 2 to 13, various kinds of aberration can be made favorable in these Examples.

In place of or together with the low-pass filter, an infrared-blocking filter or cover glass may be inserted between the imaging lens and the light-receiving surface of the solid-state imaging device.

As explained in the foregoing, since the imaging lens in accordance with the present invention is composed of two meniscus lenses whose convex surfaces face each other, it can attain a smaller size, while yielding a wide angle of view and a high brightness. Further, its cost can be lowered upon mass production, while allowing various kinds of aberration to become favorable. Accordingly, it is suitable as a taking lens for various kinds of video cameras and still video cameras.

TABLE 1

| Surface | R | d | n | ν |
|---|---|---|---|---|
| *1 | −6.397 | 5.0 | 1.51825 | 63.8 |
| *2 | −4.264 | 0.9 | | |
| *3 | 5.773 | 4.5 | 1.80831 | 46.3 |
| *4 | 12.314 | 1.0 | | |
| 5 | ∞ | 0.8 | 1.51825 | 63.8 |
| 6 | ∞ | | | |

Aspheric surface data

| Surface | K | $a_4$ | $a_6$ | $a_8$ | $a_{10}$ |
|---|---|---|---|---|---|
| 1 | 1.0 | $-2.40694 \times 10^{-3}$ | $1.29383 \times 10^{-6}$ | $-5.28133 \times 10^{-10}$ | $-1.12011 \times 10^{-12}$ |
| 2 | 1.0 | $2.75436 \times 10^{-3}$ | $-1.90534 \times 10^{-7}$ | $-6.80485 \times 10^{-10}$ | $-1.16406 \times 10^{-12}$ |
| 3 | 1.0 | $1.76486 \times 10^{-3}$ | $-3.45557 \times 10^{-7}$ | $-8.77817 \times 10^{-10}$ | $-1.46513 \times 10^{-12}$ |
| 4 | 1.0 | $4.31567 \times 10^{-3}$ | $-5.43600 \times 10^{-7}$ | $-9.07253 \times 10^{-10}$ | $-1.49858 \times 10^{-12}$ | f = 4.97 mm  Bf = 2.98 mm  Fno = 2.01
ω = 36.4°  |$R_1/f$| = 1.29  $R_1/R_2$ = 1.5

TABLE 2

| Surface | R | d | n | ν |
|---|---|---|---|---|
| *1 | −3.976 | 4.3 | 1.80831 | 46.3 |
| *2 | −7.281 | 0.6 | | |
| *3 | 4.997 | 3.8 | 1.77621 | 49.4 |
| *4 | 59.999 | 1.0 | | |
| 5 | ∞ | 0.8 | 1.51825 | 63.8 |
| 6 | ∞ | | | |

Aspheric surface data

| Surface | K | $a_4$ | $a_6$ | $a_8$ | $a_{10}$ |
|---|---|---|---|---|---|
| 1 | 1.0 | $8.74360 \times 10^{-4}$ | $-1.31015 \times 10^{-7}$ | $-2.53846 \times 10^{-10}$ | $-4.56667 \times 10^{-13}$ |
| 2 | 1.0 | $-7.48944 \times 10^{-4}$ | $-1.19210 \times 10^{-7}$ | $-2.68379 \times 10^{-10}$ | $-4.81835 \times 10^{-13}$ |
| 3 | 1.0 | $-7.48762 \times 10^{-4}$ | $-2.53188 \times 10^{-7}$ | $-3.80999 \times 10^{-10}$ | $-6.58368 \times 10^{-13}$ |
| 4 | 1.0 | $2.16692 \times 10^{-3}$ | $-1.80991 \times 10^{-7}$ | $-3.94817 \times 10^{-10}$ | $-6.83533 \times 10^{-13}$ | f = 5.51 mm  Bf = 6.00 mm  Fno = 2.00
ω = 32.9°  |$R_1/f$| = 0.72  $R_1/R_2$ = 0.55

TABLE 3

| Surface | R | d | n | ν |
|---|---|---|---|---|
| *1 | −3.200 | 3.0 | 1.69980 | 55.2 |
| *2 | −3.556 | 0.1 | | |
| *3 | 4.146 | 2.2 | 1.51825 | 63.8 |
| *4 | 20.000 | 1.0 | | |
| 5 | ∞ | 0.8 | 1.51825 | 63.8 |
| 6 | ∞ | | | |

Aspheric surface data

| Surface | K | $a_4$ | $a_6$ | $a_8$ | $a_{10}$ |
|---|---|---|---|---|---|
| 1 | 1.0 | $-2.32317 \times 10^{-3}$ | $1.82161 \times 10^{-6}$ | $4.97254 \times 10^{-10}$ | $7.96357 \times 10^{-13}$ |
| 2 | 1.0 | $2.09554 \times 10^{-3}$ | $3.89617 \times 10^{-7}$ | $4.12586 \times 10^{-10}$ | $9.19888 \times 10^{-13}$ |
| 3 | 1.0 | $3.25905 \times 10^{-3}$ | $6.74213 \times 10^{-7}$ | $9.50477 \times 10^{-10}$ | $1.72798 \times 10^{-12}$ |
| 4 | 1.0 | $4.57564 \times 10^{-3}$ | $5.35787 \times 10^{-7}$ | $1.02537 \times 10^{-9}$ | $1.86086 \times 10^{-12}$ | f = 4.99 mm  Bf = 5.26 mm  Fno = 2.03
ω = 36.5°  |$R_1/f$| = 0.64  $R_1/R_2$ = 0.9

TABLE 4

| Surface | R | d | n | ν |
|---|---|---|---|---|
| 1 | −4.080 | 4.4 | 1.80831 | 46.3 |
| 2 | −5.473 | 0.1 | | |
| 3 | 3.903 | 3.3 | 1.49217 | 57.3 |
| *4 | 71.430 | 1.0 | | |
| 5 | ∞ | 0.8 | 1.51825 | 63.8 |
| 6 | ∞ | | | |

Aspheric surface data

| Surface | K | $a_4$ | $a_6$ | $a_8$ | $a_{10}$ |
|---|---|---|---|---|---|
| 4 | 1.0 | $4.72286 \times 10^{-3}$ | $5.24850 \times 10^{-7}$ | $9.75245 \times 10^{-10}$ | $1.78605 \times 10^{-12}$ | f = 5.01 mm  Bf = 5.08 mm  Fno = 2.17
ω = 36.4°  |$R_1$/f| = 0.81  $R_1/R_2$ = 0.75

TABLE 5

| Surface | R | d | n | ν |
|---|---|---|---|---|
| *1 | −5.077 | 4.9 | 1.49217 | 57.3 |
| *2 | −3.872 | 0.1 | | |
| *3 | 4.039 | 4.6 | 1.49217 | 57.3 |
| *4 | 9.616 | 1.0 | | |
| 5 | ∞ | 0.8 | 1.51825 | 63.8 |
| 6 | ∞ | | | |

Aspheric surface data

| Surface | K | $a_4$ | $a_6$ | $a_8$ | $a_{10}$ |
|---|---|---|---|---|---|
| 1 | 1.0 | $-2.21590 \times 10^{-3}$ | $1.42077 \times 10^{-6}$ | $-2.95315 \times 10^{-10}$ | $-6.99357 \times 10^{-13}$ |
| 2 | 1.0 | $2.90113 \times 10^{-3}$ | $5.41565 \times 10^{-8}$ | $-4.32572 \times 10^{-10}$ | $-7.19208 \times 10^{-13}$ |
| 3 | 1.0 | $1.74368 \times 10^{-3}$ | $1.40212 \times 10^{-7}$ | $-5.18379 \times 10^{-10}$ | $-8.51504 \times 10^{-13}$ |
| 4 | 1.0 | $4.42440 \times 10^{-3}$ | $-3.29142 \times 10^{-7}$ | $-5.32774 \times 10^{-10}$ | $-8.60849 \times 10^{-13}$ | f = 4.99 mm  Bf = 2.98 mm  Fno = 2.07
ω = 36.5°  |$R_1$/f| = 1.02  $R_1/R_2$ = 1.31

TABLE 6

| Surface | R | d | n | ν |
|---|---|---|---|---|
| 1 | −4.716 | 4.9 | 1.83962 | 42.7 |
| 2 | −6.445 | 0.1 | | |
| *3 | 3.980 | 4.2 | 1.49217 | 57.3 |
| *4 | 80.000 | 1.0 | | |
| 5 | ∞ | 0.8 | 1.51825 | 63.8 |
| 6 | ∞ | | | |

Aspheric surface data

| Surface | K | $a_4$ | $a_6$ | $a_8$ | $a_{10}$ |
|---|---|---|---|---|---|
| 3 | 1.0 | $-6.70638 \times 10^{-4}$ | $-3.62254 \times 10^{-8}$ | $-5.81493 \times 10^{-12}$ | $-8.30664 \times 10^{-15}$ |
| 4 | 1.0 | $4.61393 \times 10^{-3}$ | $5.17765 \times 10^{-7}$ | $9.64444 \times 10^{-10}$ | $1.76877 \times 10^{-12}$ | f = 5.18 mm  Bf = 4.81 mm  Fno = 2.11
ω = 34.3°  |$R_1$/f| = 0.91  $R_1/R_2$ = 0.73

What is claimed is:

1. An imaging lens consisting of, successively from an object side,
   a first lens made of a meniscus lens having a convex surface directed toward an image surface side,
   a second lens made of a meniscus lens having a convex surface directed toward the object side;
   wherein at least one of four lens surfaces is formed as an aspheric surface
   a stop disposed between said first and second lenses and wherein said first lens, said second lens and said stop are an imaging lens.

2. An imaging lens according to claim 1 wherein four lens surfaces are formed as aspheric surfaces.

3. An imaging lens according to claim 1 wherein said at lest one surface is a fourth lens surface from an object side.

4. An imaging lens according to claim 1 wherein said at least one surface is lens surfaces three and four from an object side.

5. An imaging lens comprising successively from an object side, a first lens made of a meniscus lens having a convex surface directed toward an image surface side, a second lens made of a meniscus lens having a convex surface directed toward the object side;

wherein at least one of four lens surfaces is formed as an aspheric surface and further comprising a stop disposed between said first and second lenses.

wherein said imaging lens satisfies the following conditional expressions (1) and (2)

$$0.6 \leq |R_1/f| \leq 1.35 \quad (1)$$

$$0.5 \leq R_1/R_2 \leq 1.6 \quad (2)$$

wherein $R_1$ and $R_2$ are surfaces of said first lens on the object side and image surface side, respectively, and f is a focal length of the whole lens system.

6. An imaging lens according to claim 5, further comprising a stop disposed between said first and second lenses.

7. An imaging lens according to claim 5, wherein four lens surfaces are formed as aspheric surfaces.

8. An imaging lens according to claim 5, wherein said at least one surface is a fourth lens surface from an object side.

9. An imaging lens according to claim 5, wherein said at least one surface is lens surfaces three and four from an object side.

* * * * *